United States Patent

Takai et al.

Patent Number: 5,911,921
Date of Patent: Jun. 15, 1999

[54] NON-STOICHIOMETRIC YTTERBIUM PHOSPHATE POWDER OF LOW INFRARED REFLECTIVITY

[75] Inventors: Yasushi Takai; Yuji Kimura; Shigeru Sakai, all of Takefu, Japan

[73] Assignee: Shin-Etsu Chemical Co., Ltd., Tokyo, Japan

[21] Appl. No.: 08/915,083

[22] Filed: Aug. 20, 1997

[30] Foreign Application Priority Data

Sep. 13, 1996 [JP] Japan ................................. 8-243075

[51] Int. Cl.$^6$ .............................. G02B 5/20; C01F 17/00; C09D 11/00
[52] U.S. Cl. ........................... 252/584; 252/587; 423/263; 423/21.1; 423/21.5
[58] Field of Search ..................... 252/584, 587, 252/301.4 P; 423/263, 21.1, 21.5; 106/31.14, 31.15

[56] References Cited

U.S. PATENT DOCUMENTS

| | | | |
|---|---|---|---|
| 5,415,851 | 5/1995 | Kimura et al. | 423/263 |
| 5,470,503 | 11/1995 | Braconnier | 423/263 |
| 5,569,531 | 10/1996 | Ohiwa et al. | 428/323 |
| 5,746,944 | 5/1998 | Braconnier | 423/263 |

FOREIGN PATENT DOCUMENTS

| | | |
|---|---|---|
| 524034A1 | 1/1993 | European Pat. Off. . |
| 581622A1 | 2/1994 | European Pat. Off. . |
| 646631 | 4/1995 | European Pat. Off. . |
| 646631A2 | 4/1995 | European Pat. Off. . |
| 719654 | 7/1996 | European Pat. Off. . |
| 8-209110 | 8/1996 | Japan . |

OTHER PUBLICATIONS

European Search Report along with ANNEX to the European Search Report on European Patent Application No. EP 97402052; date of search Nov. 7, 1997 Place of Search "The Hague"; Examined by: B. Rigondaud, (1997).

Chemical Abstracts, vol. 125, No. 22, Nov. 25, 1996; abstract No:278841; Tajima Shinji Et al., "Ytterbium Phosphate Infrared–Absorbing Materials, Their Manufacture, Inks, Invisible Paterns and Information Patterns Containing Them" XP002044211; & JP08209110A (Dainippon Co., Ltd) Aug. 13, 1996.

Database WPI, Section CH, Week 9517; Derwent Publications Ltd., GB; Class G02, AN 95 128628; XP002044212 & JP 07053946A (Dainippon Printing Co) Feb. 28, 1995.

Chemical Abstracts, vol. 95, No. 2, Jul. 13, 1981; Columbus, OH, US; Abstract No.: 17205e; Hukuo Keniti Et al., "Syntheses of Rare Earth Orthophosphates (RPO4.nH2O,R= La–Yb, n=0–2)"; XP002046104 abstract & Nagoya Kogyo Daigaku Gakuko, vol. 31, 1980, pp. 175–182.

Chemical Abstracts, vol. 125, No. 4; Jul. 22, 1996; Columbus. Ohio US; Abstract No. 44624; Kimura Juji et al.; "Rare Earth Element Phosphate Salt particles and their manufacture"; XP002044229 and abstract JP08059217A (Shinetsu Chem. Ind Co.) Mar. 5, 1996.

*Primary Examiner*—Philip Tucker
*Attorney, Agent, or Firm*—Dougherty & Troxell

[57] ABSTRACT

Proposed is a powder of ytterbium phosphate having a non-stoichiometric phosphorus to ytterbium molar ratio of 1.08 to 2.0 and having a specified average particle diameter and specified diameter of the crystallites forming the particles. The powder is useful as an infrared-absorbing pigment in a printing ink invisible to naked eyes but detectable by an infrared detecting means for printing of stealth bar code patterns. The ytterbium phosphate powder can be prepared in a convenient and inexpensive method utilizing the precipitation reaction by mixing an aqueous phosphoric acid solution and ytterbium salt solution under specified conditions followed by calcination of the precipitates at a specified temperature and pulverization of the calcined precipitates to give the specified average particle diameter.

8 Claims, 1 Drawing Sheet

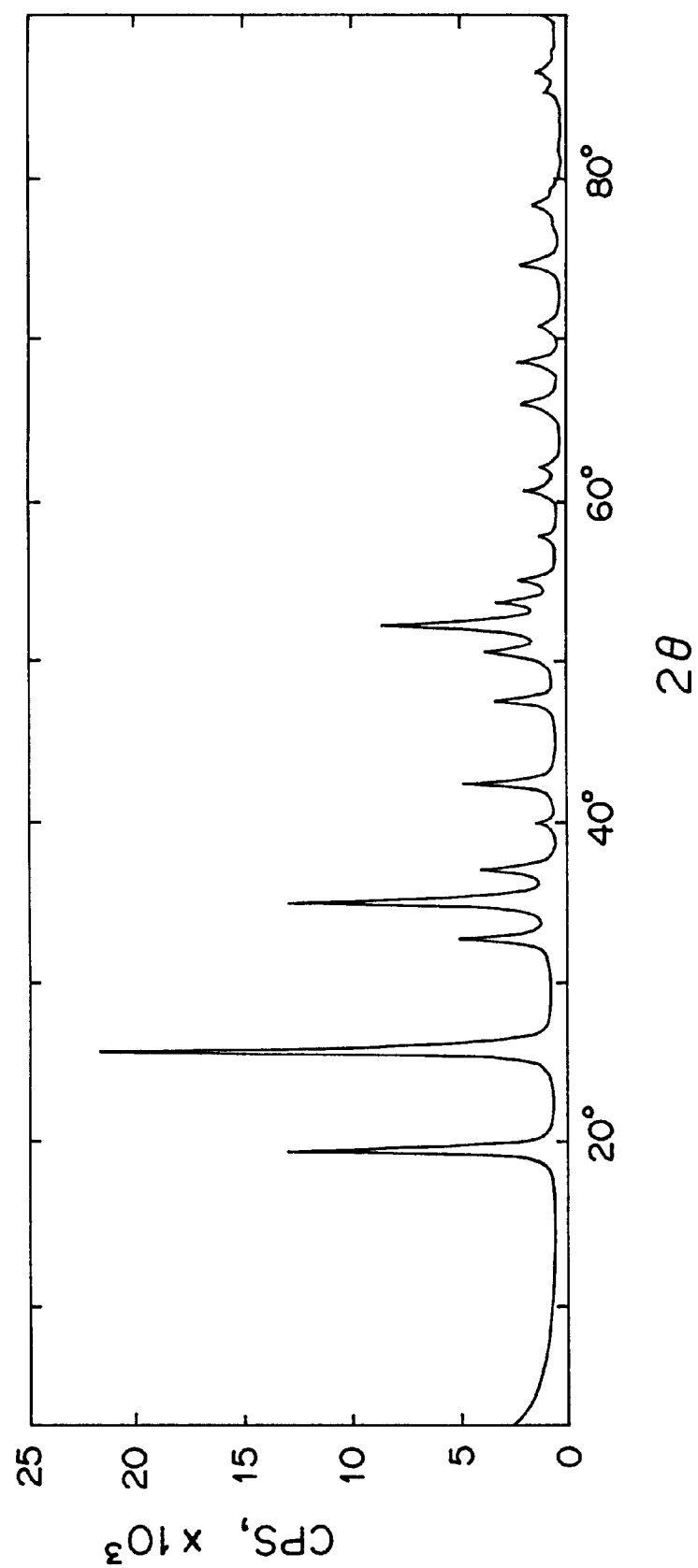

NON-STOICHIOMETRIC YTTERBIUM PHOSPHATE POWDER OF LOW INFRARED REFLECTIVITY

BACKGROUND OF THE INVENTION

The present invention relates to a powder of ytterbium phosphate of low infrared reflectivity having a non-stoichiometric phosphorus to ytterbium molar ratio or, more particularly, to a powder of ytterbium phosphate having an overstoichiometric phosphorus content relative to ytterbium which exhibits a remarkably low infrared reflection so as to be useful as an infrared-absorbing agent in an invisible ink for printing of an information data pattern, such as bar code patterns, optically detectable only by using an infrared detecting means but invisible to naked eyes or so-called stealth code patterns.

It may be too much to say that the bar code systems are very widely utilized in recent years in various fields including material distribution management systems. As is known, a bar code pattern is usually formed by printing a seemingly randomized stripe pattern on the surface of a substrate with a colored or, in most cases, black printing ink containing a black pigment such as carbon black. The bar code patterns formed by printing with such a black ink, though convenient in respect of good recognizability by naked eyes, on the other hand, have some problems due to the visibility of the pattern. One of the problems is that, because the bar code pattern occupies a substantial area on the substrate surface, decorativeness of the goods bearing the bar code pattern is greatly limited or decreased thereby not to allow a fully decorative design of, for example, packages as desired. The second of the problems is that, because the bar code pattern is readily and directly recognizable by any person handling the materials, secrecy of the information expressed by the bar code pattern cannot be secured sometimes.

In view of these problems, several attempts and proposals have been made, as disclosed in Japanese Patent Kokai 3-154187, 3-227378, 3-275389, 4-70349 and 5-93160, and elsewhere, to develop a printing ink invisible to naked eyes but detectable only by using an optical means such as an infrared detector.

One of the approaches in this regard proposed in these prior art documents is to utilize an infrared-absorbing organic dye of low infrared reflectivity including cyanine-based dyes, naphthoquinone dyes and the like. These organic dyes, however, are not quite satisfactory for the purpose because, if not to mention their relatively low fastness under exposure to ambience, the dyes are not completely colorless in the visible wavelength region of light but have, though weak, selective light reflection in the visible region so that patterns printed with an ink containing such an organic dye usually exhibit a slightly reddish creamy color not to give a complete solution for the above mentioned problems.

As a counterpart class of the organic infrared-absorbing materials, inorganic infrared-absorbing materials or inorganic materials having low infrared reflectivity but high reflectivity in the visible wavelength region are also under investigations. For example, Tajima in Japanese Patent Kokai 7-53946 proposes use of a powder of ytterbium phosphate as an infrared-absorbing agent useful as an ingredient in invisible printing inks. The ytterbium phosphate disclosed there is an orthophosphate of ytterbium, which is one of the rare earth elements having an atomic number of 70, expressed by the formula $YbPO_4$. According to the disclosure there, the ytterbium phosphate powder was prepared by a process in which a blend of ytterbium oxide $Yb_2O_3$ and phosphorus pentoxide $P_2O_5$ was melted by heating at 1300° C. for 2 hours in a platinum crucible and a solid obtained by annealing the melt, which was identified to be ytterbium orthophosphate by the X-ray diffractometric study, was pulverized into a powder. It is recommended that the rate of annealing is so adjusted that the crystallites forming the particles of the powder may have a diameter in the range from 5 to 200 nm in order to have high infrared absorptivity or low infrared reflectivity and the particles have an average particle diameter of 0.01 to 0.1 μm with a maximum particle diameter not exceeding 1 μm in order not to exceed the thickness of films formed by printing with a printing ink containing the powder. While ytterbium compounds in general, such as oxide and hydroxide, exhibit low infrared reflectivity, the infrared reflectivity of these compounds is not low enough as compared with the phosphate and Tajima teaches that the infrared reflectivity of the ytterbium phosphate powder can be controlled by adequately selecting the annealing rate of the melt.

The above described ytterbium phosphate powder disclosed by Tajima, however, is not industrially practicable not only because of the use of an expensive platinum crucible but also because of the use of a very high temperature of 1300° C. or higher for melting of the blend of ytterbium oxide and phosphorus pentoxide necessitating special expensive furnace facilities in the preparation thereof.

SUMMARY OF THE INVENTION

The present invention accordingly has an object to provide a novel ytterbium phosphate-based powder material which can be prepared at low costs and is useful as an infrared-absorbing agent in an invisible but infrared-detectable printing ink suitable for printing of an information data pattern such as stealth bar code patterns.

Thus, the present invention provides a powder of non-stoichiometric ytterbium phosphate having a phosphorus to ytterbium molar ratio in the range from 1.08 to 2.00, of which the particles have an average particle diameter in the range from 0.1 μm to 5 μm and the crystallites forming the particles have a diameter in the range from 20 nm to 40 nm.

It is noted that the non-stoichiometric ytterbium phosphate powder of the invention need not have a high purity of ytterbium relative to the rare earth elements but can be a mixture or combination of rare earth phosphates, of which at least 65% by moles is ytterbium phosphate, without substantial adverse influences on the infrared-absorbing or infrared-reflecting characteristics of the non-stoichiometric ytterbium phosphate powder. The rare earth elements to be combined with ytterbium can be any of the rare earth elements including yttrium and the elements having an atomic number of 57 to 71.

The above defined non-stoichiometric ytterbium phosphate powder or mixed rare earth phosphate powder can be prepared by a precipitation method in which an aqueous solution of a water-soluble ytterbium salt or mixed rare earth salts and an aqueous solution of phosphoric acid are blended together at 50 to 100° C. in a specified phosphorus to rare earths molar proportion of 1.2 to 6.0 to precipitate a phosphate powder of ytterbium or mixed rare earths which is recovered from the precipitation medium and calcined at a temperature of 300 to 1100° C. for 2 to 15 hours in an oxidizing atmosphere followed by disintegration or pulverization of the calcined mass to such an extent that the powder may have the above mentioned specific average particle diameter.

BRIEF DESCRIPTION OF THE DRAWING

The FIGURE is an X-ray diffractometric diagram of the non-stoichiometric ytterbium phosphate powder prepared in Example 2 showing peaks assignable to both of ytterbium orthophosphate $YbPO_4$ and ytterbium trimetaphosphate $Yb(PO_3)_3$.

DETAILED DESCRIPTION OF THE PREFERRED EMBODIMENTS

As is described above, the non-stoichiometric ytterbium phosphate powder of the present invention is characterized by the specific non-stoichiometric phosphorus to ytterbium molar ratio and by the particle characteristics relative to the average particle diameter and the diameter of the crystallites forming the particles. When these requirements are satisfied, the non-stoichiometric ytterbium phosphate powder of the invention exhibits lower than 40% of the reflectivity on the surface of a powder layer in the wavelength region of 975 to 977 nm assuming a 100% surface reflectivity for the surface of a barium sulfate layer.

It is well known that tervalent ytterbium ions $Yb^{3+}$ exhibit strong absorption of infrared light so that compounds, e.g., oxide, hydroxide, phosphate and sulfate, of tervalent ytterbium ions in general absorb infrared light although the strength of infrared absorption depends on the types of the compounds. For example, the infrared absorptions of ytterbium hydroxide and oxide are 26% and 47%, respectively. Phosphates of tervalent ytterbium are the most promising as an infrared absorbing agent in infrared-detectable invisible inks in respect of the outstandingly low infrared reflection on the powder surface.

As is mentioned above, the rare earth element forming the non-stoichiometric phosphate of the invention need not be high purity ytterbium but can be a combination of ytterbium with one or more of other rare earth elements provided that at least 65% by moles of the combined rare earth elements be ytterbium. This means that it is not necessary to prepare the inventive non-stoichiometric ytterbium phosphate from a very expensive ytterbium compound of high rare earth purity but can be prepared from an intermediately purified ytterbium compound obtained at lower costs to give a great economical advantage although the infrared-absorbing characteristic of the non-stoichiometric phosphate is greatly decreased when the molar proportion of ytterbium in the combined rare earth elements is smaller than 65%.

The most characteristic feature of the inventive ytterbium phosphate powder is that the phosphate is non-stoichiometric with a molar ratio of phosphorus to ytterbium or combined rare earth elements in the range from 1.08 to 2.00 or, preferably, from 1.08 to 1.20. When the molar ratio is smaller or larger than this range, a great decrease is caused in the infrared absorptivity of the phosphate powder even if the requirements for the average particle diameter of the particles and the diameter of the crystallites forming the particles are satisfied.

It would be a reasonable assumption that the efficiency of infrared absorption of a powder is high with low surface reflection when each of the particles consists of a single crystallite and the surface of the particles is smooth without defects such as fissures and cracks detectable on a scanning electron microscopic photograph. Further, the efficiency of infrared absorption is increased by increasing the diameter of the crystallites. In these regards, the disclosure of Japanese Patent Kokai 7-53946 teaches that the diameter of the crystallites of ytterbium orthophosphate should be in the range from 5 to 200 nm or, preferably, from 10 to 100 nm and the particles obtained by pulverization of the solidified melt should have an average particle diameter in the range from 0.01 $\mu$m to 0.1 $\mu$m.

In the non-stoichiometric ytterbium phosphate powder of the invention, the phosphate crystallites forming the particles should have a diameter in the range from 20 nm to 40 nm and the particles should have an average particle diameter in the range from 0.1 $\mu$m to 5 $\mu$m or, preferable, from 0.1 $\mu$m to 0.2 $\mu$m. When the requirements for these parameters are not satisfied, the efficiency of infrared absorption of the powder would be greatly decreased even if the requirement for the non-stoichiometric phosphorus to ytterbium molar ratio is satisfied. These parameters relative to the particle characteristics of the non-stoichiometric ytterbium phosphate powder are each controllable by appropriately selecting the conditions in the calcination of the phosphate precipitates and the disintegration or pulverization of the mass after calcination. It is remarkable that the production costs of the inventive non-stoichiometric ytterbium phosphate particles are relatively low when the powder is prepared under conditions to satisfy these requirements. Another requirement for the particle diameter is that the average particle diameter should be smaller than a half of the wavelength of the visible light in order to ensure good transparency of the printed ink layer containing the particles to the visible light or to ensure invisibility of the printed bar code pattern. When the invisibility of the printed pattern can be somewhat incomplete, the average particle diameter of the non-stoichiometric ytterbium phosphate powder can be somewhat larger than a half of the wavelength of visible light.

As to the relationship between the average particle diameter of the phosphate particles and the thickness of the printed ink layer, even the average particle diameter of 5 $\mu$m is not too large depending on the types of the printing method with the printing ink containing the particles. For example, the printed ink layer formed by gravure printing has a thickness of 2 $\mu$m to 5 $\mu$m and the printed ink layer formed by screen printing has a thickness of as large as 20 $\mu$m to 40 $\mu$m so that particles of 5 $\mu$m diameter can be fully embedded in the ink layer.

Further, the limitation in the average particle diameter of the phosphate particles should be considered as a factor having influences on the viscosity or consistency of the printing ink containing the particles. Assuming that the formulation of the printing ink relative to the amounts of the vehicle resin and the particulate ingredients be identical, namely, the viscosity of the printing ink is usually increased by decreasing the average particle diameter of the particulate ingredients. Accordingly, the average particle diameter of the ytterbium phosphate powder cannot be too small in order to avoid undue increase in the viscosity of the printing ink formulated therewith.

In the following, a description is given of the procedure for the preparation of the non-stoichiometric ytterbium phosphate powder according to the invention.

As is mentioned before, the non-stoichiometric rare earth phosphate powder of the invention is prepared by the precipitation method in which an aqueous solution of a water-soluble salt of ytterbium or a combination of rare earth elements including ytterbium and an aqueous solution of phosphoric acid are blended together to form precipitates of the non-stoichiometric rare earth phosphate in the aqueous medium.

The water-soluble salt of ytterbium is selected, though not particularly limitative, from chloride, nitrate and sulfate of ytterbium, of which ytterbium nitrate is preferred because any nitrate residue possibly contained in the phosphate precipitates can be completely removed by thermal decomposition in the calcination treatment of the precipitates. The aqueous solution of the water-soluble ytterbium or mixed rare earth salt is prepared in a concentration in the range from 0.1 to 1.0 mole/liter relative to the element of ytterbium or combined rare earth elements. The aqueous phosphoric acid solution, on the other hand, should have a concentration in the range from 0.06 to 2.5 moles/liter. When the concentrations of these two aqueous solutions are too low, the precipitation reaction must be conducted in an excessively large reaction vessel to cause an economical disadvantage due to a decrease in the productivity. When the concentrations are too high, a difficulty is encountered in the control of the precipitation reaction resulting in irreproducible properties of the products.

The above prepared two aqueous solutions are then blended together at a temperature in the range from 50 to 100° C. under agitation, preferably, over a period of 180 seconds or shorter so that precipitates of the ytterbium or mixed rare earth phosphate are formed in the aqueous medium. It is optional that the aqueous solution of phosphoric acid is added to the aqueous solution of the rare earth salt or vice versa. In order that the thus formed ytterbium phosphate or the combined rare earth phosphate may have a non-stoichiometric phosphorus to ytterbium or phosphorus to rare earths molar ratio of 1.08 to 2.00, the blending proportion of the two aqueous solutions is selected in such a way that the molar ratio of phosphorus in the phosphoric acid to the ytterbium element or the combined rare earth elements in the water-soluble salt is in the range from 1.2 to 6.0. When this molar ratio is too small, the molar ratio of phosphorus to the rare earth element in the precipitates of phosphate cannot be 1.08 or higher while the molar ratio of phosphorus to rare earth element would be larger than 2.00 when the amount of phosphoric acid is too large relative to the rare earth salt. It is advantageous that each of the two aqueous solutions before blending is heated and kept at a temperature of 50° C. or higher up to the boiling point so that the precipitation reaction takes place at a temperature in the range from 50° C. to the boiling point of the aqueous precipitation medium. The precipitates of ytterbium phosphate formed in the aqueous precipitation medium are kept as such for 10 to 60 minutes to effect aging of the precipitates at 50 to 100° C. In conducting the precipitation reaction of ytterbium phosphate, it is preferable that the concentrations and volumes of the two aqueous solutions, i.e. the phosphoric acid solution and ytterbium salt solution, are adjusted in such a way that the content of ytterbium element in the precipitation mixture after mixing of the two solution is in the range from 0.05 to 0.2 mole/liter.

The precipitates of the non-stoichiometric phosphate of ytterbium or combined rare earth elements formed in the aqueous precipitation medium are then collected by filtration or other suitable solid-liquid separating means and dried and calcined at a temperature in the range from 300 to 1100° C. or, preferably, from 300 to 900° C. in an oxidizing atmosphere such as atmospheric air for a length of time in the range from 2 to 15 hours or, preferably, from 2 to 8 hours. It is not always necessary that the precipitates recovered from the aqueous precipitation medium are washed with water to be freed from any electrolytes provided that the ytterbium salt as the starting material is ytterbium nitrate for the reasons mentioned before. It should be noted that the conditions of this calcination treatment are particularly determinative of the crystallite size of the phosphate particles which must be in the range from 20 nm to 40 nm in diameter. The crystallite size would be too large when the temperature is too high or the time is too long in the calcination of the phosphate precipitates while the crystallite size would be too small when the temperature is too low or the time is too short. In an example, a quite satisfactory results can be obtained by a calcination treatment at 300° C. for 6 hours.

According to the results of the X-ray diffractometric study, the thus obtained ytterbium phosphate of an overstoichiometric phosphorus content consists mainly of two different crystallographic phases of which one is the orthophosphate of ytterbium $YbPO_4$ and the other is trimetaphosphate of ytterbium $Yb(NO_3)_3$ by making comparison of the X-ray diffractometric diagram such as the diagram shown in the accompanying drawing with authentic crystallographic X-ray diffraction peak data. When the temperature of calcination is low, for example, at 400° C. or below, the predominant crystallographic phase is the orthophosphate of ytterbium.

Though dependent on the conditions of calcination, the precipitates after the calcination treatment form a mass of agglomeration so that the mass is disintegrated or pulverized into a powder having a specified average particle diameter in the range from 0.1 to 5 μm or, preferably, from 0.1 to 0.2 μm. It is important to avoid overgrinding in the pulverization. Pulverization of the mass obtained by the calcination treatment of the precipitates of ytterbium phosphate is performed preferably by a wet-process method in a liquid pulverization medium by using a suitable pulverizing machine such as a beads mill.

When the intended application of the inventive ytterbium phosphate powder is as an infrared-absorbing pigment in an infrared-detectable stealth ink which may be a water-base ink or an organic ink, it is a convenient way that the above mentioned pulverization is conducted in the liquid medium for the respective ink to form a slurry of the ytterbium phosphate powder. An aqueous slurry of the ytterbium phosphate powder is prepared by adding the unpulverized ytterbium phosphate obtained by calcination in an amount to give a solid content of the mixture not exceeding 30% by weight followed by pulverization in a beads mill. It is advantageous to keep the aqueous pulverization medium having a pH not lower than 4, if necessary, by using ammonia water or an aqueous solution of sodium hydroxide. The thus obtained aqueous slurry of the ytterbium phosphate particles is admixed with a silane coupling agent so as to effect a surface treatment of the particles followed by centrifugation to remove a part of the aqueous medium or to adjust the solid content of the slurry so that the remaining aqueous slurry may have a viscosity, though dependent on the average particle diameter of the ytterbium phosphate particles, not to exceed 500 centipoise. Thereafter, the aqueous slurry is admixed with an aqueous solution of a water-soluble resin or an aqueous emulsion of a water-insoluble resin as a binder or vehicle resin followed by a further continued pulverization treatment to give an ink composition for invisible printing.

In the preparation of an organic ink containing the ytterbium phosphate powder, the aqueous slurry obtained in the above described manner is dehydrated to give a dried ytterbium phosphate powder which is then dispersed in an organic solvent in an amount to give a solid content not exceeding 30% by weight and the ytterbium phosphate powder is again pulverized in the organic solvent by using a beads mill. Examples of suitable organic solvents include aromatic hydrocarbon solvents such as toluene and xylene and ketone solvents such as methyl ethyl ketone. It is advantageous that the pulverization medium is admixed with a surface active agent such as polycarboxylic acid-based ones as a dispersing aid in an amount of 3 to 7% by weight based on the amount of the ytterbium phosphate powder. Thereafter, the pulverization mixture is admixed with a silane coupling agent to effect a surface treatment of the particles followed by centrifugation to remove a part of the organic solvent or to adjust the solid content to exceed 50% by weight. The thus obtained organic slurry of the ytterbium phosphate particles is admixed with a solution of a vehicle resin followed by further milling in a beads mill to give the desired organic ink composition.

In the following, the ytterbium phosphate powder having a non-stoichiometric phosphorus to ytterbium molar ratio is illustrated in more detail by way of Examples and Comparative Examples, which, however, never limit the scope of the present invention in any way. In the following Examples and Comparative Examples, the powder parameters of the ytterbium phosphate powders and mixed rare earth phosphate powders were measured in the following manner.

Average particle diameter of the powders was determined by the laser diffraction method. The crystallite diameter was calculated by the Scherrer's method, which is applicable to a crystallite diameter not exceeding 100 nm, utilizing the results obtained in the X-ray diffractometric study. The infrared absorption in % was obtained by measuring the reflectivity in % of the powder surface using a spectrophotometer at a wavelength of 976 nm and subtracting the reflectivity in % from 100% taking the reflectivity of a barium sulfate powder as 100%.

EXAMPLE 1

A 1 liter portion of an aqueous solution of ytterbium nitrate in a concentration of 1 mole/liter as prepared by dissolving ytterbium oxide in 55% excess of nitric acid was poured into 9 liters of a 0.222 mole/liter aqueous solution of phosphoric acid at 76° C. taking 141 seconds. The content of ytterbium element in the precipitation mixture after blending of the two solutions was 0.1 mole/liter. The above mentioned concentrations and volumes of the two aqueous solutions corresponded to a phosphorus to ytterbium molar ratio of 2.0. The precipitates formed in the aqueous medium were collected by filtration and, without washing with water, dried and calcined in air at 300° C. for 4 hours followed by wet-process pulverization in water to give a powder having an average particle diameter of 0.12 µm.

Table 1 below summarizes the results of the evaluation tests undertaken for the powder separated from the aqueous pulverization medium and then dried including the phosphorus to ytterbium molar ratio, average particle diameter in µm, diameter of the crystallites in nm and infrared absorption in %.

EXAMPLE 2

The experimental procedure was about the same as in Example 1, in which 1 liter of an aqueous solution of ytterbium nitrate in a concentration of 0.5 mole/liter as prepared by dissolving ytterbium oxide in 45% excess of nitric acid was poured into 9 liters of a 0.067 mole/liter aqueous solution of phosphoric acid at 80° C. taking 7 seconds. The content of ytterbium element in the precipitation mixture after blending of the two solutions was 0.05 mole/liter. The above mentioned concentrations and volumes of the two aqueous solutions corresponded to a phosphorus to ytterbium molar ratio of 1.2 instead of 2.0 in Example 1. The precipitates formed in the aqueous medium were collected by filtration and, without washing with water, dried and calcined in air at 300° C. for 2 hours. Pulverization of the calcined precipitates was conducted in toluene instead of water.

Table 1 below summarizes the results of the evaluation tests of the thus obtained ytterbium phosphate powder undertaken in the same manner as in Example 1. FIGURE of the accompanying drawing is an X-ray diffractometric diagram of the ytterbium phosphate powder obtained here with the abscissa given in degrees for 2θ (Cu Kα).

EXAMPLE 3

The experimental procedure was about the same as in Example 1, in which 2 liters of an aqueous solution of ytterbium nitrate in a concentration of 0.5 mole/liter as prepared by dissolving ytterbium oxide in 63% excess of nitric acid were poured into 8 liters of a 0.188 mole/liter aqueous solution of phosphoric acid at 76° C. taking 6 seconds. The content of ytterbium element in the precipitation mixture after blending of the two solutions was 0.1 mole/liter. The above mentioned concentrations and volumes of the two aqueous solutions corresponded to a phosphorus to ytterbium molar ratio of 1.5 instead of 2.0. The precipitates formed in the aqueous medium were collected by filtration and, without washing with water, dried and calcined in air at 300° C. for 8 hours. Pulverization of the calcined precipitates was conducted in isopropyl alcohol instead of water.

Table 1 below summarizes the results of the evaluation tests of the thus obtained ytterbium phosphate powder undertaken in the same manner as in Example 1.

EXAMPLE 4

The experimental procedure was about the same as in Example 1, in which 1 liter of an aqueous solution of ytterbium nitrate in a concentration of 0.2 mole/liter as prepared by dissolving ytterbium oxide in 63% excess of nitric acid was poured into 1 liter of a 0.3 mole/liter aqueous solution of phosphoric acid at 78° C. taking 9 seconds. The content of ytterbium element in the precipitation mixture after blending of the two solutions was 0.1 mole/liter. The above mentioned concentrations and volumes of the two aqueous solutions corresponded to a phosphorus to ytterbium molar ratio of 1.5 instead of 2.0. The precipitates formed in the aqueous medium were collected by filtration and, without washing with water, dried and calcined in air at 900° C. for 3 hours. Pulverization of the calcined precipitates was conducted in n-butyl alcohol instead of water.

Table 1 below summarizes the results of the evaluation tests of the thus obtained ytterbium phosphate powder undertaken in the same manner as in Example 1.

EXAMPLE 5

The experimental procedure was about the same as in Example 1, in which 4 liters of an aqueous solution of ytterbium nitrate in a concentration of 0.5 mole/liter as prepared by dissolving ytterbium oxide in 45% excess of nitric acid were poured into 6 liters of a 0.667 mole/liter aqueous solution of phosphoric acid at 77° C. taking 5 seconds. The content of ytterbium element in the precipitation mixture after blending of the two solutions was 0.2 mole/liter. The above mentioned concentrations and volumes of the two aqueous solutions corresponded to a phosphorus to ytterbium molar ratio of 2.0. The precipitates formed in the aqueous medium were collected by filtration and, without washing with water, dried and calcined in air at 900° C. for 3 hours. Pulverization of the calcined precipitates was conducted in water.

Table 1 below summarizes the results of the evaluation tests of the thus obtained ytterbium phosphate powder undertaken in the same manner as in Example 1.

EXAMPLE 6

The experimental procedure was about the same as in Example 1, in which 4 liters of an aqueous solution of ytterbium nitrate in a concentration of 0.5 mole/liter as prepared by dissolving ytterbium oxide in 50% excess of nitric acid were poured into 6 liters of a 0.667 mole/liter aqueous solution of phosphoric acid at 76° C. taking 10 seconds. The content of ytterbium element in the precipitation mixture after blending of the two solutions was 0.2 mole/liter. The above mentioned concentrations and volumes of the two aqueous solutions corresponded to a phosphorus to ytterbium molar ratio of 2.0. The precipitates formed in the aqueous medium were collected by filtration and, without washing with water, dried and calcined in air at 300° C. for 6 hours. Pulverization of the calcined precipitates was conducted in water.

Table 1 below summarizes the results of the evaluation tests of the thus obtained ytterbium phosphate powder undertaken in the same manner as in Example 1.

EXAMPLE 7

The experimental procedure was about the same as in Example 1 but the precipitation reaction was conducted by pouring an aqueous phosphoric acid solution into an aqueous ytterbium nitrate solution. Thus 2 liters of a 1 mole/liter aqueous solution of phosphoric acid were poured into 8 liters of an aqueous solution of ytterbium nitrate in a concentration of 0.125 mole/liter as prepared by dissolving ytterbium oxide in 43% excess of nitric acid at 76° C. taking 141 seconds. The content of ytterbium element in the precipitation mixture after blending of the two solutions was 0.1 mole/liter. The above mentioned concentrations and volumes of the two aqueous solutions corresponded to a phosphorus to ytterbium molar ratio of 2.0. The precipitates formed in the aqueous medium were collected by filtration and, without washing with water, dried and calcined in air at 300° C. for 14 hours. Pulverization of the calcined precipitates was conducted in water.

Table 1 below summarizes the results of the evaluation tests of the thus obtained ytterbium phosphate powder undertaken in the same manner as in Example 1.

EXAMPLE 8

The experimental procedure was about the same as in Example 7, in which 5 liters of a 0.4 mole/liter aqueous solution of phosphoric acid were poured into 5 liters of an aqueous solution of ytterbium nitrate in a concentration of 0.2 mole/liter as prepared by dissolving ytterbium oxide in 63% excess of nitric acid at 80° C. taking 5 seconds. The content of ytterbium element in the precipitation mixture after blending of the two solutions was 0.1 mole/liter. The above mentioned concentrations and volumes of the two aqueous solutions corresponded to a phosphorus to ytterbium molar ratio of 2.0. The precipitates formed in the aqueous medium were collected by filtration and, without washing with water, dried and calcined in air at 1100° C. for 14 hours. Pulverization of the calcined precipitates was conducted in water.

Table 1 below summarizes the results of the evaluation tests of the thus obtained ytterbium phosphate powder undertaken in the same manner as in Example 1.

EXAMPLE 9

The experimental procedure was about the same as in Example 7, in which 2 liters of a 1 mole/liter aqueous solution of phosphoric acid were poured into 8 liters of an aqueous solution of ytterbium nitrate in a concentration of 0.125 mole/liter as prepared by dissolving ytterbium oxide in 42% excess of nitric acid at 76° C. taking 155 seconds. The content of ytterbium element in the precipitation mixture after blending of the two solutions was 0.1 mole/liter. The above mentioned concentrations and volumes of the two aqueous solutions corresponded to a phosphorus to ytterbium molar ratio of 2.0. The precipitates formed in the aqueous medium were collected by filtration and, without washing with water, dried and calcined in air at 900° C. for 15 hours. Pulverization of the calcined precipitates was conducted in water.

Table 1 below summarizes the results of the evaluation tests of the thus obtained ytterbium phosphate powder undertaken in the same manner as in Example 1.

EXAMPLE 10

The experimental procedure was about the same as in Example 7, in which 2 liters of a 2.5 mole/liter aqueous solution of phosphoric acid were poured into 8 liters of an aqueous solution of ytterbium nitrate in a concentration of 0.125 mole/liter as prepared by dissolving ytterbium oxide in 45% excess of nitric acid at 76° C. taking 140 seconds. The content of ytterbium element in the precipitation mixture after blending of the two solutions was 0.1 mole/liter. The above mentioned concentrations and volumes of the two aqueous solutions corresponded to a phosphorus to ytterbium molar ratio of 5.0. The precipitates formed in the aqueous medium were collected by filtration and, without washing with water, dried and calcined in air at 900° C. for 2 hours. Pulverization of the calcined precipitates was conducted in water.

Table 1 below summarizes the results of the evaluation tests of the thus obtained ytterbium phosphate powder undertaken in the same manner as in Example 1.

EXAMPLE 11

The experimental procedure was about the same as in Example 7, but the ytterbium nitrate solution was replaced with a solution of an ytterbium-yttrium mixed rare earth nitrate of which the molar ratio of ytterbium to yttrium was 99:1. Thus, 2 liters of a 1 mole/liter aqueous solution of phosphoric acid were poured into 8 liters of an aqueous solution of the mixed rare earth nitrate in a total rare earth concentration of 0.125 mole/liter as prepared by dissolving ytterbium oxide and yttrium oxide in the above mentioned molar proportion in 33% excess of nitric acid at 75° C. taking 86 seconds. The content of the rare earth elements in the precipitation mixture after blending of the two solutions was 0.1 mole/liter. The above mentioned concentrations and volumes of the two aqueous solutions corresponded to a phosphorus to rare earth elements molar ratio of 2.0. The precipitates formed in the aqueous medium were collected by filtration and, without washing with water, dried and calcined in air at 300° C. for 6 hours. Pulverization of the calcined precipitates was conducted in water.

Table 1 below summarizes the results of the evaluation tests of the thus obtained mixed rare earth phosphate powder undertaken in the same manner as in Example 1.

EXAMPLE 12

The experimental procedure was about the same as in Example 11, but the ytterbium to yttrium molar ratio in the mixed rare earth nitrate solution was 79:21 instead of 99:1.

Thus, 2 liters of a 1 mole/liter aqueous solution of phosphoric acid were poured into 8 liters of an aqueous solution of the mixed rare earth nitrate in a total rare earth concentration of 0.125 mole/liter as prepared by dissolving ytterbium oxide and yttrium oxide in the above mentioned molar proportion in 37% excess of nitric acid at 80° C. taking 153 seconds. The content of the rare earth elements in the precipitation mixture after blending of the two solutions was 0.1 mole/liter. The above mentioned concentrations and volumes of the two aqueous solutions corresponded to a phosphorus to rare earth elements molar ratio of 2.0. The precipitates formed in the aqueous medium were collected by filtration and, without washing with water, dried and calcined in air at 300° C. for 6 hours. Pulverization of the calcined precipitates was conducted in water.

Table 1 below summarizes the results of the evaluation tests of the thus obtained mixed rare earth phosphate powder undertaken in the same manner as in Example 1.

EXAMPLE 13

The experimental procedure was about the same as in Example 11, but the ytterbium to yttrium molar ratio in the mixed rare earth nitrate solution was 75:25 instead of 99:1. Thus, 2 liters of a 1 mole/liter aqueous solution of phosphoric acid were poured into 8 liters of an aqueous solution of the mixed rare earth nitrate in a total rare earth concentration of 0.125 mole/liter as prepared by dissolving ytterbium oxide and yttrium oxide in the above mentioned molar proportion in 37% excess of nitric acid at 76° C. taking 150 seconds. The content of the rare earth elements in the precipitation mixture after blending of the two solutions was 0.1 mole/liter. The above mentioned concentrations and volumes of the two aqueous solutions corresponded to a phosphorus to rare earth elements molar ratio of 2.0. The precipitates formed in the aqueous medium were collected by filtration and, without washing with water, dried and calcined in air at 300° C. for 6 hours. Pulverization of the calcined precipitates was conducted in water.

Table 1 below summarizes the results of the evaluation tests of the thus obtained mixed rare earth phosphate powder undertaken in the same manner as in Example 1.

EXAMPLE 14

The experimental procedure was about the same as in Example 11, but the ytterbium to yttrium molar ratio in the mixed rare earth nitrate solution was 65:35 instead of 99:1. Thus, 2 liters of a 1 mole/liter aqueous solution of phosphoric acid were poured into 8 liters of an aqueous solution of the mixed rare earth nitrate in a total rare earth concentration of 0.125 mole/liter as prepared by dissolving ytterbium oxide and yttrium oxide in the above mentioned molar proportion in 39% excess of nitric acid at 76° C. taking 175 seconds. The content of the rare earth elements in the precipitation mixture after blending of the two solutions was 0.1 mole/liter. The above mentioned concentrations and volumes of the two aqueous solutions corresponded to a phosphorus to rare earths molar ratio of 2.0. The precipitates formed in the aqueous medium were collected by filtration and, without washing with water, dried and calcined in air at 300° C. for 6 hours. Pulverization of the calcined precipitates was conducted in water.

Table 1 below summarizes the results of the evaluation tests of the thus obtained mixed rare earth phosphate powder undertaken in the same manner as in Example 1.

EXAMPLE 15

The experimental procedure was about the same as in Example 11, but the combination of the rare earth elements in the rare earth nitrate solution was a quaternary combination of ytterbium, lanthanum, cerium and terbium in a molar ratio of 80:10:7:3. Thus, 2 liters of a 1 mole/liter aqueous solution of phosphoric acid were poured into 8 liters of an aqueous solution of the mixed rare earth nitrate in a total rare earth concentration of 0.125 mole/liter as prepared by dissolving ytterbium oxide, lanthanum oxide, cerium oxide and terbium oxide in the above mentioned molar proportion in 45% excess of nitric acid at 80° C. taking 140 seconds. The total content of the rare earth elements in the precipitation mixture after blending of the two solutions was 0.1 mole/liter. The above mentioned concentrations and volumes of the two aqueous solutions corresponded to a phosphorus to rare earths molar ratio of 2.0. The precipitates formed in the aqueous medium were collected by filtration and, without washing with water, dried and calcined in air at 900° C. for 2 hours. Pulverization of the calcined precipitates was conducted in water.

Table 1 below summarizes the results of the evaluation tests of the thus obtained mixed rare earth phosphate powder undertaken in the same manner as in Example 1.

EXAMPLE 16

The experimental procedure was just the same as in Example 15 except that the molar ratio of the four rare earth elements, i.e. ytterbium, lanthanum, cerium and terbium, in the mixed rare earth nitrate solution was 70:15:10:5.

Table 1 below summarizes the results of the evaluation tests of the thus obtained mixed rare earth phosphate powder undertaken in the same manner as in Example 1

COMPARATIVE EXAMPLE 1

The experimental procedure was substantially the same as in Example 2 except that the precipitates recovered from the precipitation medium were not calcined at 300° C. but merely vacuum-dried at room temperature for 12 hours and the dried precipitates were disintegrated in a dry process to give a coarser average particle diameter than in Example 2.

Table 2 below summarizes the results of the evaluation tests of the thus obtained ytterbium phosphate powder undertaken in the same manner as in Example 1.

COMPARATIVE EXAMPLE 2

The experimental procedure was substantially the same as in Example 2 except that the precipitates recovered from the precipitation medium were not calcined at 300° C. but merely vacuum-dried at 100° C. for 12 hours and the dried precipitates were disintegrated in a dry process to give a coarser average particle diameter than in Example 2.

Table 2 below summarizes the results of the evaluation tests of the thus obtained ytterbium phosphate powder undertaken in the same manner as in Example 1.

COMPARATIVE EXAMPLE 3

The experimental procedure was about the same as in Example 1, in which 2 liters of an aqueous solution of ytterbium nitrate in a concentration of 0.5 mole/liter as prepared by dissolving ytterbium oxide in 17% excess of nitric acid were poured into 8 liters of a 0.188 mole/liter aqueous solution of phosphoric acid at 78° C. taking 5 seconds. The content of ytterbium element in the precipitation mixture after blending of the two solutions was 0.1 mole/liter. The above mentioned concentrations and volumes of the two aqueous solutions corresponded to a phosphorus to ytterbium molar ratio of 1.5 instead of 2.0. The precipitates formed in the aqueous medium were collected by filtration and, after washing with water, dried and calcined in air at 300° C. for 7 hours. Pulverization of the calcined precipitates was conducted in a dry process instead of the wet process in water.

Table 2 below summarizes the results of the evaluation tests of the thus obtained ytterbium phosphate powder undertaken in the same manner as in Example 1.

COMPARATIVE EXAMPLE 4

The experimental procedure was about the same as in Comparative Example 3 except that calcination of the dried precipitates was conducted for 2 hours at 800° C. instead of 7 hours at 300° C.

Table 2 below summarizes the results of the evaluation tests of the thus obtained ytterbium phosphate powder undertaken in the same manner as in Example 1.

COMPARATIVE EXAMPLE 5

The experimental procedure was about the same as in Comparative Example 3, in which 2 liters of an aqueous solution of ytterbium nitrate in a concentration of 0.25 mole/liter as prepared by dissolving ytterbium oxide in 17% excess of nitric acid was poured into 8 liters of a 0.075 mole/liter aqueous solution of phosphoric acid at 78° C. taking 12 seconds. The content of ytterbium element in the precipitation mixture after blending of the two solutions was 0.05 mole/liter. The above mentioned concentrations and volumes of the two aqueous solutions corresponded to a phosphorus to ytterbium molar ratio of 1.2 instead of 1.5. The precipitates formed in the aqueous medium were collected by filtration and, after washing with water, dried and calcined in air at 300° C. for 7 hours. Pulverization of the calcined precipitates was conducted in a dry process instead of the wet process in water.

Table 2 below summarizes the results of the evaluation tests of the thus obtained ytterbium phosphate powder undertaken in the same manner as in Example 1.

COMPARATIVE EXAMPLE 6

The experimental procedure was about the same as in Comparative Example 5 except that the precipitation reaction was conducted at 76° C. instead of 78° C. and the ytterbium nitrate solution was added to the phosphoric acid solution taking 14 seconds instead of 12 seconds. The precipitates were calcined, without washing with water, in air for 5 hours at 1400° C. instead of 7 hours at 300° C.

Table 2 below summarizes the results of the evaluation tests of the thus obtained ytterbium phosphate powder undertaken in the same manner as in Example 1.

COMPARATIVE EXAMPLE 7

The experimental procedure was about the same as in Example 1, in which 2 liters of an aqueous solution of ytterbium nitrate in a concentration of 0.5 mole/liter as prepared by dissolving ytterbium oxide in 63% excess of nitric acid were poured into 8 liters of a 0.25 mole/liter aqueous solution of phosphoric acid at 80° C. taking 5 seconds. The content of ytterbium element in the precipitation mixture after blending of the two solutions was 0.1 mole/liter. The above mentioned concentrations and volumes of the two aqueous solutions corresponded to a phosphorus to ytterbium molar ratio of 2.0. The precipitates formed in the aqueous medium were collected by filtration and, without washing with water, dried and calcined in air at 1250° C. for 5 hours. Pulverization of the calcined precipitates was conducted in n-butyl alcohol instead of water.

Table 2 below summarizes the results of the evaluation tests of the thus obtained ytterbium phosphate powder undertaken in the same manner as in Example 1.

COMPARATIVE EXAMPLE 8

Precipitates of ytterbium phosphate were prepared by the simultaneous introduction of 1 liter of a 1.2 moles/liter aqueous solution of ytterbium nitrate prepared by dissolving ytterbium oxide in 17% excess of nitric acid and 0.5 liter of a 1 mole/liter ammonia water into 0.5 liter of a 2.4 moles/liter aqueous solution of ammonium phosphate at 80° C. taking 60 minutes. The content of ytterbium element in the precipitation mixture after blending of the solutions was 0.6 mole/liter. The above mentioned concentrations and volumes of the aqueous solutions corresponded to a phosphorus to ytterbium molar ratio of 1.0. The precipitates formed in the aqueous medium were collected by filtration and, after washing with water, dried and calcined in air at 800° C. for 2 hours. Pulverization of the calcined precipitates was conducted in a dry process.

Table 2 below summarizes the results of the evaluation tests of the thus obtained ytterbium phosphate powder undertaken in the same manner as in Example 1.

COMPARATIVE EXAMPLE 9

The experimental procedure was substantially the same as in Comparative Example 8, in which calcined precipitates of ytterbium phosphate were pulverized in toluene instead of the pulverization in a dry process.

Table 2 below summarizes the results of the evaluation tests of the thus obtained ytterbium phosphate powder undertaken in the same manner as in Example 1.

COMPARATIVE EXAMPLE 10

The experimental procedure was substantially the same as in Comparative Example 8, in which precipitates of ytterbium phosphate were prepared by the simultaneous introduction of 1 liter of a 1.2 moles/liter aqueous solution of ytterbium nitrate prepared by dissolving ytterbium oxide in 45% excess of nitric acid and 0.5 liter of a 7 moles/liter ammonia water into 0.5 liter of a 6 mole/liter aqueous solution of ammonium phosphate at 76° C. taking 60 minutes. The content of ytterbium element in the precipitation mixture after blending of the solutions was 0.6 moles/liter. The above mentioned concentrations and volumes of the aqueous solutions corresponded to a phosphorus to ytterbium molar ratio of 2.5. The precipitates formed in the aqueous medium were collected by filtration and, after washing with water, dried and calcined in air at 800° C. for 2 hours. Pulverization of the calcined precipitates was conducted in water.

Table 2 below summarizes the results of the evaluation tests of the thus obtained ytterbium phosphate powder undertaken in the same manner as in Example 1.

COMPARATIVE EXAMPLE 11

The experimental procedure was substantially the same as in Comparative Example 8, in which precipitates of ytterbium phosphate were prepared by the simultaneous introduction of 1 liter of a 1.2 moles/liter aqueous solution of ytterbium nitrate prepared by dissolving ytterbium oxide in 17% excess of nitric acid and 0.5 liter of a 7.2 moles/liter ammonia water into 0.5 liter of a 7 moles/liter aqueous solution of ammonium phosphate at 78° C. taking 60 minutes. The content of ytterbium element in the precipitation mixture after blending of the solutions was 0.6 mole/liter. The above mentioned concentrations and volumes of the aqueous solutions corresponded to a phosphorus to ytterbium molar ratio of 3.0. The precipitates formed in the aqueous medium were collected by filtration and, after washing with water, dried and calcined in air at 800° C. for 2 hours. Pulverization of the calcined precipitates was conducted in water.

Table 2 below summarizes the results of the evaluation tests of the thus obtained ytterbium phosphate powder undertaken in the same manner as in Example 1.

COMPARATIVE EXAMPLE 12

The experimental procedure was about the same as in Example 7, but the ytterbium nitrate solution was replaced with a solution of an ytterbium-yttrium mixed rare earth nitrate of which the molar ratio of ytterbium to yttrium was 55:45. Thus, 1 liter of a 0.4 mole/liter aqueous solution of phosphoric acid were poured into 1 liter of an aqueous solution of the mixed rare earth nitrate in a total rare earth concentration of 0.2 mole/liter as prepared by dissolving ytterbium oxide and yttrium oxide in the above mentioned molar proportion in 41% excess of nitric acid at 74° C. taking 160 seconds. The total content of the rare earth elements in the precipitation mixture after blending of the two solutions was 0.1 mole/liter. The above mentioned concentrations and volumes of the two aqueous solutions corresponded to a phosphorus to rare earths molar ratio of 2.0. The precipitates formed in the aqueous medium were collected by filtration and, without washing with water, dried and calcined in air at 300° C. for 6 hours. Pulverization of the calcined precipitates was conducted in water.

Table 2 below summarizes the results of the evaluation tests of the thus obtained mixed rare earth phosphate powder undertaken in the same manner as in Example 1.

COMPARATIVE EXAMPLE 13

The experimental procedure was about the same as in Example 7, but the ytterbium nitrate solution was replaced with an aqueous solution of a ytterbium-lanthanum-cerium-terbium mixed rare earth nitrate of which the molar ratio of ytterbium:lanthanum:cerium:terbium was 60:20:14:6. Thus, 1 liter of a 0.4 mole/liter aqueous solution of phosphoric acid was poured into 1 liter of an aqueous solution of the mixed rare earth nitrate in a total rare earth concentration of 0.2 mole/liter as prepared by dissolving respective oxides of the four rare earth elements in the above mentioned molar proportion in 45% excess of nitric acid at 80° C. taking 140 seconds. The total content of the rare earth elements in the precipitation mixture after blending of the two solutions was 0.1 mole/liter. The above mentioned concentrations and volumes of the two aqueous solutions corresponded to a phosphorus to rare earths molar ratio of 2.0. The precipitates formed in the aqueous medium were collected by filtration and, without washing with water, dried and calcined in air at 900° C. for 2 hours. Pulverization of the calcined precipitates was conducted in water.

Table 2 below summarizes the results of the evaluation tests undertaken in the same manner as in Example 1

TABLE 1

| Example No. | P:rare earth molar ratio | Av. particle diameter, $\mu$m | Crystallite diameter, nm | Infrared absorption, % |
|---|---|---|---|---|
| 1 | 1.13 | 0.12 | 29 | 69 |
| 2 | 1.09 | 1.5 | 32 | 69 |
| 3 | 1.08 | 0.8 | 28 | 64 |
| 4 | 1.1 | 3.1 | 32 | 79 |
| 5 | 1.6 | 0.8 | 30 | 60 |
| 6 | 1.1 | 0.9 | 29 | 67 |
| 7 | 1.1 | 0.15 | 30 | 62 |
| 8 | 1.14 | 1.6 | 33 | 62 |
| 9 | 1.08 | 0.13 | 31 | 63 |
| 10 | 1.9 | 0.17 | 30 | 60 |
| 11 | 1.18 | 0.15 | 22 | 69 |
| 12 | 1.21 | 0.11 | 23 | 62 |
| 13 | 1.24 | 0.16 | 23 | 62 |
| 14 | 1.28 | 0.18 | 24 | 60 |
| 15 | 1.35 | 0.17 | 37 | 65 |
| 16 | 1.45 | 0.15 | 39 | 64 |

TABLE 2

| Comparative Example No. | P:rare earth molar ratio | Av. particle diameter, $\mu$m | Crystallite diameter, nm | Infrared absorption, % |
|---|---|---|---|---|
| 1 | 1.09 | 6.7 | 10 | 51 |
| 2 | 1.09 | 7.0 | 11 | 43 |
| 3 | 1.072 | 2.0 | 28 | 47 |
| 4 | 1.072 | 8.8 | 34 | 44 |
| 5 | 1.054 | 7.5 | 25 | 39 |
| 6 | 1.059 | 9.8 | 85 | 39 |
| 7 | 1.6 | 2.0 | 41 | 37 |
| 8 | 1.04 | 9.5 | 16 | 50 |
| 9 | 0.97 | 1.2 | 13 | 44 |
| 10 | 2.2 | 0.15 | 26 | 40 |
| 11 | 2.9 | 0.13 | 33 | 48 |
| 12 | 1.3 | 0.2 | 22 | 51 |
| 13 | 1.35 | 0.17 | 37 | 45 |

What is claimed is:

1. A powder of ytterbium phosphate having a non-stoichiometric chemical composition relative to the molar ratio of phosphorus to ytterbium in the range from 1.08 to 2.0 and consisting of particles having an average particle diameter in the range from 0.1 $\mu$m to 5.0 $\mu$m, the particles being formed from crystallites having a diameter in the range from 20 nm to 40 nm.

2. A phosphate powder of a combination of at least two rare earth elements, of which at least 65% by moles is ytterbium, having a non-stoichiometric chemical composition relative to the molar ratio of phosphorus to the rare earth elements in combination in the range from 1.08 to 2.0 and consisting of particles having an average particle diameter in the range from 0.1 $\mu$m to 5.0 $\mu$m, the particles being formed from crystallites having a diameter in the range from 20 nm to 40 nm.

3. A method for the preparation of a powder of ytterbium phosphate containing a non-stoichiometric amount of phosphorous relative to ytterbium which comprises the steps of:

(a) mixing an aqueous solution of phosphoric acid and an aqueous solution of a water-soluble ytterbium salt in such a proportion that the molar ratio of phosphorus in the phosphoric acid solution and ytterbium in the ytterbium salt solution is in the range from 1.2 to 6.0 at a temperature in the range from 50 to 100° C. to form precipitates of ytterbium phosphate in an aqueous precipitation medium wherein the content of the ytterbium element in the aqueous precipitation medium after mixing of the aqueous phosphoric acid solution and the aqueous ytterbium salt solution is in the range from 0.05 to 0.2 mole per liter of the total volume of the aqueous precipitation medium and the precipitates of ytterbium phosphate;

(b) separating the precipitates of ytterbium phosphate from the aqueous precipitation medium;

(c) calcining the precipitates of ytterbium phosphate at a temperature in the range from 300° C. to 1100° C. for a length of time in the range from 2 hours to 15 hours; and (d) pulverizing the calcined precipitates of ytterbium phosphate into a powder to such an extent that particles of the powder have an average particle diameter in the range from 0.1 $\mu$m to 5.0 $\mu$m.

4. The method for the preparation of a powder of ytterbium phosphate as claimed in claim 3 in which the water-soluble ytterbium salt is ytterbium nitrate.

5. The method for the preparation of a powder of ytterbium phosphate as claimed in claim 3 in which mixing of the aqueous phosphoric acid solution and the aqueous ytterbium salt solution in step (a) is completed within 180 seconds.

6. The method for the preparation of a powder of ytterbium phosphate as claimed in claim 3 in which the temperature of calcination in step (c) is in the range from 300 to 900° C.

7. The method for the preparation of a powder of ytterbium phosphate as claimed in claim 3 in which the precipitates of ytterbium phosphate formed in step (a) are kept, prior to step (b), in the aqueous precipitation medium at a temperature in the range from 50 to 100° C. for 10 minutes to 60 minutes.

8. A printing ink composition capable of forming a printed pattern invisible to naked eyes but detectable by an infrared detecting means which comprises:

(A) a liquid medium;

(B) a vehicle resin dissolved or dispersed in the liquid medium; and (C) a powder of ytterbium phosphate having a non-stoichiometric chemical composition relative to the molar ratio of phosphorus to ytterbium in the range from 1.08 to 2.0 and consisting of particles having an average particle diameter in the range from 0.1 $\mu$m to 5.0 $\mu$m, the particles being formed from crystallites having a diameter in the range from 20 nm to 40 nm, dispersed in the liquid medium.

\* \* \* \* \*